(12) United States Patent
McEwan et al.

(10) Patent No.: US 11,441,609 B2
(45) Date of Patent: Sep. 13, 2022

(54) BEARING MATERIAL, BEARING ELEMENT AND METHOD

(71) Applicants: Mahle International GmbH, Stuttgart (DE); Mahle Engine Systems UK Limited, Warwickshire (GB)

(72) Inventors: Kayleigh McEwan, Coalville (GB); Jennifer Harvey, Warwickshire (GB)

(73) Assignees: MAHLE INTERNATIONAL GMBH; MAHLE ENGINE SYSTEMS UK LIMITED

( * ) Notice: Subject to any disclaimer, the term of this patent is extended or adjusted under 35 U.S.C. 154(b) by 221 days.

(21) Appl. No.: 16/212,666

(22) Filed: Dec. 6, 2018

(65) Prior Publication Data
US 2019/0178290 A1 Jun. 13, 2019

(30) Foreign Application Priority Data
Dec. 7, 2017 (GB) ...................... 1720428

(51) Int. Cl.
*F16C 33/20* (2006.01)
*C09D 7/40* (2018.01)
*C09D 179/08* (2006.01)
*C09D 7/63* (2018.01)
*F16C 17/02* (2006.01)
(Continued)

(52) U.S. Cl.
CPC ............. *F16C 33/201* (2013.01); *C08K 3/08* (2013.01); *C08K 5/34924* (2013.01); *C08L 79/08* (2013.01); *C09D 7/63* (2018.01); *C09D 7/69* (2018.01); *C09D 179/08* (2013.01); *F16C 17/022* (2013.01); *F16C 33/203* (2013.01); *F16C 33/208* (2013.01); *C08K 5/34928* (2013.01); *C08K 2003/0812* (2013.01); *C08K 2201/005* (2013.01); *C08L 2201/02* (2013.01); *C08L 2201/50* (2013.01); *F16C 2202/50* (2013.01); *F16C 2208/02* (2013.01); *F16C 2208/42* (2013.01); *F16C 2223/30* (2013.01); *F16C 2240/48* (2013.01); *F16C 2360/22* (2013.01)

(58) Field of Classification Search
CPC ..... C08K 5/34924; C08L 79/08; F16C 33/20; F16C 33/201; F16C 33/203; F16C 33/205; F16C 33/206; C09D 179/08
See application file for complete search history.

(56) References Cited

U.S. PATENT DOCUMENTS 10,550,239 B2   2/2020  Laing et al.
2017/0051782 A1*  2/2017  Jones ...................... F16C 43/02
(Continued)

FOREIGN PATENT DOCUMENTS

CN   103225482 A  *  7/2013
CN   106459477 A      2/2017
(Continued)

OTHER PUBLICATIONS

Horizon (AEO Peregal, Horizon Mixtures Co., 2020, 3 pages).*
(Continued)

*Primary Examiner* — Brieann R Johnston
(74) *Attorney, Agent, or Firm* — Fishman Stewart PLLC

(57) ABSTRACT

A bearing material may include a polymeric matrix of polyamide-imide (PAI) polymer material and a plurality of melamine cyanurate particles dispersed within the polymeric matrix.

19 Claims, 2 Drawing Sheets

(51) Int. Cl.
  *C08K 3/08*  (2006.01)
  *C08K 5/3492*  (2006.01)
  *C08L 79/08*  (2006.01)

(56) References Cited

U.S. PATENT DOCUMENTS

| | | |
|---|---|---|
| 2017/0088791 A1 | 3/2017 | Kobayakawa et al. |
| 2017/0313893 A1 | 11/2017 | Yasuda et al. |

FOREIGN PATENT DOCUMENTS

| | | | | |
|---|---|---|---|---|
| EP | 2821443 A1 | | 1/2015 | |
| GB | 2524255 A | * | 9/2015 | ............ F16C 33/208 |
| JP | 2004149622 A | * | 5/2004 | ........ C10M 169/044 |
| JP | 2006-045463 A | | 2/2006 | |
| JP | 2006045463 A | * | 2/2006 | |
| JP | 2006-160799 A | | 6/2006 | |
| JP | 2006160799 A | * | 6/2006 | ............ B82Y 30/00 |
| JP | 2009068584 A | * | 4/2009 | |
| JP | 2015-124338 A | | 7/2015 | |
| JP | 2015232127 A | | 12/2015 | |

OTHER PUBLICATIONS

Google patents translation of CN-103225482-A (2013, 5 pages).*
Google patents translation of JP-2006045463-A (2006, 6 pages).*
Nissan Chemical (Melamine Cyanurate, 2021,2 pages).*
Google patents translation of JP 2006160799 (2006, 12 pages).*
Translation of JP 2004149622 (2004, 14 pages).*
Translation of JP 2009068584 (2009, 7 pages).*
European search report dated Apr. 3, 2019.
Chinese Office Action dated Jan. 18, 2022 for copending Chinese Appl. No. 201811349370.0 (with English translation).

* cited by examiner

BEARING MATERIAL, BEARING ELEMENT AND METHOD

CROSS-REFERENCE TO RELATED APPLICATION

This application claims priority to Great Britain Application No. GB 1720428.0, filed on Dec. 7, 2017, the contents of which are hereby incorporated by reference in its entirety.

TECHNICAL FIELD

The invention relates to a bearing material, a bearing element, use of melamine cyanurate as a solid lubricant in a polyamide-imide (PAI) bearing material, a method of forming a bearing material, and a method of forming a bearing element. In particular, the invention relates to an improved plastics bearing material for use in an overlay forming a running surface or sliding surface of a plain bearing. Bearing materials and elements embodying the present invention are particularly suitable for use in automotive environments, including for supporting rotatable or slidable engine components and for use as, or as part of, other rotatable or slidable components such as thrust washers and flange bearing assemblies.

BACKGROUND

In internal combustion engines, the main-bearing assemblies typically each comprise a pair of half bearings retaining a crankshaft that is rotatable about an axis. Each half bearing is a generally semi-cylindrical bearing shell, and typically at least one is a flanged half bearing provided with a semi-annular thrust washer extending outwardly (radially) at each axial end.

The bearing surfaces of bearing shells conventionally have a layered construction, in which a substrate comprising a strong backing material is coated with one or more layers having preferred tribological properties to provide a bearing surface that, in use, faces a cooperating moving part such as a crankshaft journal. In known bearing shells, the substrate comprises a backing coated with a lining layer, and the substrate is in turn coated with an overlay formed from a bearing material. The overlay is typically 6 to 25 µm thick and may be formed of a plastic polymer-based composite layer or a metal-alloy layer (e.g. a tin-based alloy overlay).

The function of the overlay is to provide a relatively soft, conformable layer that can accommodate any small misalignments between the harder steel crankshaft journal and the bearing shells, and receive and embed dirt particles that may circulate in the oil supply and enter the bearing, so as to prevent damage to or scoring of the journal. These functions of the overlay are respectively termed conformability and embedability.

It is generally known that wear of the bearing material, or overlay, can lead to exposure of the lining layer to which the overlay material is applied. This can lead to failure of the sliding component due to seizure.

Polymer-based bearing materials have become popular for use as overlays in recent years, and research into sliding components has resulted in a wide range of compositions of polymeric bearing materials.

With the advent of stop start engines and trends towards engine downsizing, engine bearings, in particular conrod and main bearings, are expected to perform under increasingly severe environments. The increased number of stop start cycles, in which oil films are depleted, means that the frictional properties of the bearing overlay and the overlay lifetime are key to bearing performance.

SUMMARY

The invention provides a bearing material, a bearing element, use of melamine cyanurate as a solid lubricant in a polyamide-imide (PAI) bearing material, a method of forming a bearing material, and a method of forming a bearing element, as defined in the appended independent claim(s) to which reference should now be made. Preferred or advantageous features of the invention are set out in the dependent subclaim(s).

According to a first aspect of the present invention, there is provided a bearing material comprising a polyamide-imide (PAI) polymer material, and melamine cyanurate.

The bearing material may comprise a polymeric matrix of polyamide-imide (PAI) polymer material, and melamine cyanurate particles dispersed within the polymeric matrix.

The inventors have selected polyamide-imide (PAI) polymer material for use as the polymeric matrix in the present invention, as PAI has been found to be able to provide robust and effective bearing materials.

In the aggressive conditions of modern internal-combustion engines, stop-start operation requires a typical engine to undergo a greatly increased number of stop-start operations. Each time an engine restarts, full hydrodynamic lubrication may not be in place and so bearings such as crankshaft bearings need to be able to survive an increased number of non-hydrodynamically-lubricated start-up operations. PAI-based bearing materials, with suitable filler materials, have demonstrated superior performance to other polymer materials under such conditions.

The use of polyamide-imide (PAI) polymer material in the bearing material of the present invention may thus advantageously provide a bearing material with good performance, including conformability and embedability.

Melamine cyanurate, which may also be known as melamine-cyanuric acid adduct, melamine-cyanuric acid complex, or MCA, is commonly used as a flame or fire retardant. In the present invention, however, the inventors have found that melamine cyanurate may be used as an effective solid lubricant in a PAI-based bearing material.

The inventors of the present invention have selected melamine cyanurate for use as a solid lubricant due to its hydrogen-bonding network and low coefficient of friction, in addition to its high thermal stability and low corrosivity. These properties may make melamine cyanurate particularly advantageous for use as a solid lubricant in a PAI-based bearing material which may be subjected to high temperatures, particularly during use in a stop-start engine.

The presence of melamine cyanurate particles may advantageously increase the load-carrying capacity of the bearing material thanks to the continuous breaking and reforming of the melamine cyanurate hydrogen-bonding network during use. This may advantageously increase the fatigue resistance and wear performance of the bearing material. In addition, the high thermal stability and low corrosivity of melamine cyanurate may advantageously increase the lifetime of a bearing element coated with the bearing material of the present invention, compared to the bearing materials known in the prior art.

The existence of a hydrogen-bonded network of molecular lamina in melamine cyanurate particles may allow shearing of adjacent layers on application of a lateral force. Melamine cyanurate may thus advantageously act as an effective solid lubricant in a bearing material that experiences lateral forces during running of a bearing.

The melamine cyanurate may act as a solid lubricant in an overlay formed from bearing material by lowering the coefficient of friction of the cured bearing material. The incorporation of melamine cyanurate solid lubricant in the bearing material may thus improve running-in behaviour, torque-to-turn tests and bearing lifetimes. By improving the coefficient of friction of the bearings in an engine, use of melamine cyanurate solid lubricant may further aid in improving engine efficiency and reducing emissions.

The bearing material may comprise a solid lubricant comprising melamine cyanurate, or consisting of melamine cyanurate.

In a preferred embodiment, the bearing material comprises melamine cyanurate as the only solid lubricant material, such that the bearing material does not contain other solid lubricants such as graphite, $MoS_2$, or PTFE.

A PAI-based bearing material comprising melamine cyanurate as a solid lubricant may advantageously achieve desirable physical properties. Preferably, such a bearing material may demonstrate similar, or better, physical properties than known PAI bearing materials. For example, the bearing material of the present invention may demonstrate increased load carrying capacity. The bearing material may also exhibit improved fatigue resistance, due to the hydrogen-bonding network of the melamine cyanurate, and an enhanced lifetime thanks to the thermal stability and low corrosivity of the melamine cyanurate.

Melamine cyanurate advantageously exhibits good shear resistance characteristics, which may be attributable to the shearing and reforming of hydrogen bonds in the melamine cyanurate. This may enable the bearing material of the present invention to provide a high load carrying capacity, while still improving the frictional properties of the bearing material.

The bearing material may comprise solid particles of melamine cyanurate, dispersed throughout a matrix of PAI polymer material.

Preferably the size of the melamine cyanurate particles is selected to be less than the intended thickness of an overlay layer formed from the bearing material. Typical overlay layers on bearing elements may be less than 25 μm, or less than 12 μm, in thickness. Particle sizes smaller than the intended overlay thickness may be chosen so that the melamine cyanurate particles do not protrude from the overlay surface.

Particle sizes may be measured by dynamic light scattering.

The melamine cyanurate particles may also be chosen to be large enough to form an even dispersion in the PAI polymer material. Below a certain size, for example below about 0.2 μm, melamine cyanurate particles may tend to agglomerate in the PAI polymer material during manufacture, thus forming a bearing material with inconsistent frictional properties.

Preferably the melamine cyanurate particles have an average particle size of between about 0.2 μm and about 5 μm, preferably between about 0.5 μm and about 3 μm, particularly preferably between about 1 μm and about 2 μm.

The melamine cyanurate particles may have an average particle size of at least about 0.2 μm, or 0.5 μm, or 1 μm, or 2 μm, and/or less than or equal to about 2.5 μm, or 3 μm, or 5 μm, or 10 μm.

Preferably the bearing material comprises between about 2 wt % and about 30 wt % melamine cyanurate, preferably between about 5 wt % and about 25 wt %, particularly preferably between about 8 wt % and about 20 wt % melamine cyanurate. In certain preferred embodiments, the bearing material comprises between about 8 wt % and about 12 wt % melamine cyanurate. Within this range, the incorporation of melamine cyanurate may advantageously improve the frictional properties of the bearing material. Particularly advantageously, this quantity of melamine cyanurate may produce a bearing material with acceptable wear resistance characteristics.

Preferably the bearing material may comprises at least 2 wt %, or 3 wt %, or 5 wt %, or 8 wt %, and/or less than or equal to 10 wt %, or 12 wt %, or 15 wt %, or 20 wt %, or 25 wt %, or 30 wt % melamine cyanurate.

The bearing material may additionally comprise one or more additional filler materials, which may be incorporated into the bearing material to alter its properties. The bearing material may, for example, comprise hard filler particles for enhanced wear resistance. The bearing material may comprise additives such as metal flakes, preferably aluminium flakes, which may increase conformability, increase the fatigue resistance and increase the thermal conductivity of the bearing material, thereby allowing heat distribution throughout the polymer matrix.

The bearing material may additionally comprise additives such as dispersants, which allow the particulate content of the bearing material to be evenly dispersed throughout the polymer matrix, adhesion agents, which may improve the adhesion of the bearing material to a bearing element, and levellers.

According to a second aspect of the present invention, there is provided a bearing element comprising a bearing material according to the first aspect of the invention.

The bearing may comprise an overlay, which may be termed an overlay layer or a bearing-surface layer, formed from a bearing material according to the first aspect of the invention.

Preferably, the total thickness of the overlay is between 3 μm and 25 μm. More preferably, the total thickness of the overlay is between 8 μm and 10 μm.

Preferably the overlay consists of a single layer of bearing material. That is, the overlay preferably has a uniform composition throughout the overlay. The overlay may be formed by applying several coats of the same bearing material, such that the resulting overlay is formed entirely from the bearing material of the present invention. Preferably the overlay does not comprise a second layer formed from a different bearing material.

Features of the bearing material may be as described above in relation to the first aspect of the invention.

Bearing elements embodying the invention may be particularly suitable for use in fluid-lubricated applications. Particularly advantageous applications for the bearing elements are as sliding bearings in combustion engines, for example crankshaft and/or camshaft supporting bearings, big end bearings and small end bushings. Bearing elements embodying the invention are particularly suitable for use in vehicle engines, including those equipped with stop-start engine technology in which the engine is subjected to a substantially greater number of starts over the life of the engine than in conventional engines and in which the crankshaft is regularly accelerated from rest before a uniform hydrodynamic film of lubricant is established on the bearing/running surface.

Bearing elements embodying the invention may also be used to form any of a number of sliding surfaces on engine components including bushes, piston skirts, piston rings, liners, camshafts and conrods. They may also be used as, or as part, of any of thrust washers, flanges and half liners. Other suitable applications are envisaged and will be readily apparent to the skilled person.

According to a third aspect of the present invention, there is provided a use of melamine cyanurate as a solid lubricant in a polyamide-imide (PAI) polymer bearing material.

According to a fourth aspect of the present invention, there is provided a method of forming a bearing material, comprising the step of mixing a polyamide-imide (PAI) polymer material with particles of melamine cyanurate, to form a dispersion.

Melamine cyanurate is preferably added to the polymer material in a quantity that forms between about 2 wt % and about 30 wt %, preferably between about 5 wt % and about 25 wt %, particularly preferably between about 8 wt % and about 12 wt %, of the dispersion.

The melamine cyanurate particles may have an average particle size of at least about 0.2 µm, or 0.5 µm, or 1 µm, or 2 µm, and/or less than or equal to about 2.5 µm, or 3 µm, or 5 µm, or 10 µm.

The method may comprise the additional first step of forming a polyamide-imide (PAI) polymer material, for example via a known polymerisation reaction from suitable monomers.

According to a fifth aspect of the present invention, there is provided a method of forming a bearing element, comprising the step of depositing onto a bearing element substrate a bearing material according to the first aspect of the invention.

The method of forming a bearing element thus provides a method of forming a bearing-surface layer, or an overlay layer, on a bearing element substrate.

The bearing material may be deposited on the substrate by methods known in the art, for example by spraying.

The method may comprise the additional step of curing the bearing material once it has been deposited on the bearing element substrate.

Features of the invention that are described in relation to the first aspect apply equally to corresponding features of the second, third, fourth and fifth aspects of the invention.

BRIEF DESCRIPTION OF THE DRAWINGS

Specific embodiments of the invention will now be described by way of example, with reference to the accompanying drawings, in which.

DETAILED DESCRIPTION

Figure 1:
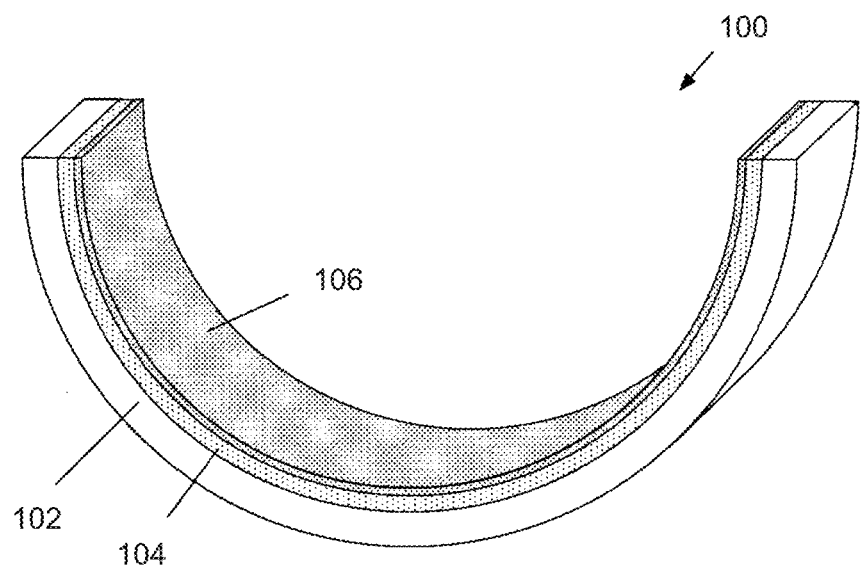
FIG. 1 shows a schematic perspective view of a semi-cylindrical half bearing shell, which is an exemplary embodiment of a bearing element embodying the present invention.
Figure 3:
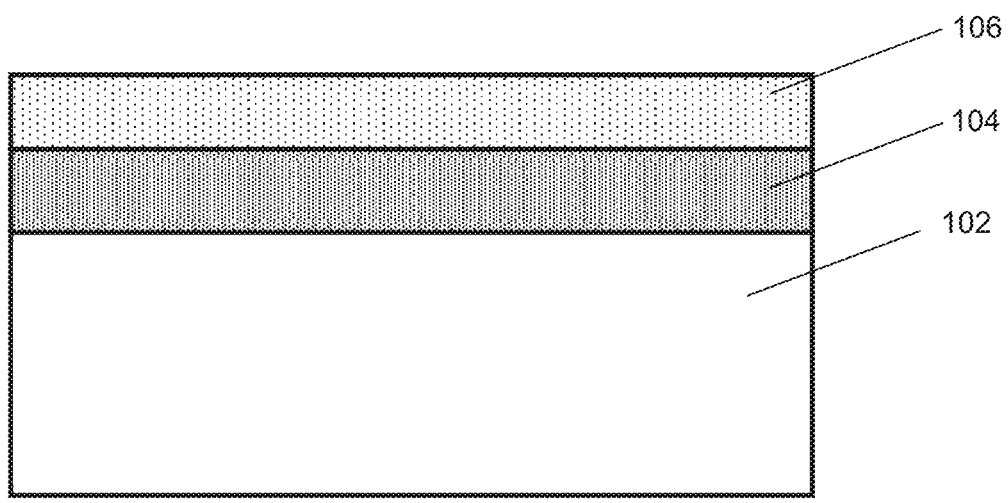
FIG. 3 shows an enlarged cross-sectional view through a part of the bearing shells of FIGS. 1 and 2.

FIG. 1 schematically illustrates a semi-cylindrical bearing shell 100, which is also commonly referred to as a half bearing or a half shell, for a main bearing assembly of an internal combustion engine for retaining a cylindrical journal of a crankshaft. A cross-section through a part of the bearing shell 100 is shown in FIG. 3.

The bearing shell 100 has a layered construction incorporating a substrate comprising a steel backing 102 and a lining layer 104 comprising a layer of aluminium-tin alloy. An overlay 106 of a bearing material is formed on top of the lining layer 104 by spray coating onto the lining layer of the substrate.

The backing 102 provides strength and resistance to deformation of the bearing shell 100, when it is assembled in a main-bearing housing.

Figure 2:
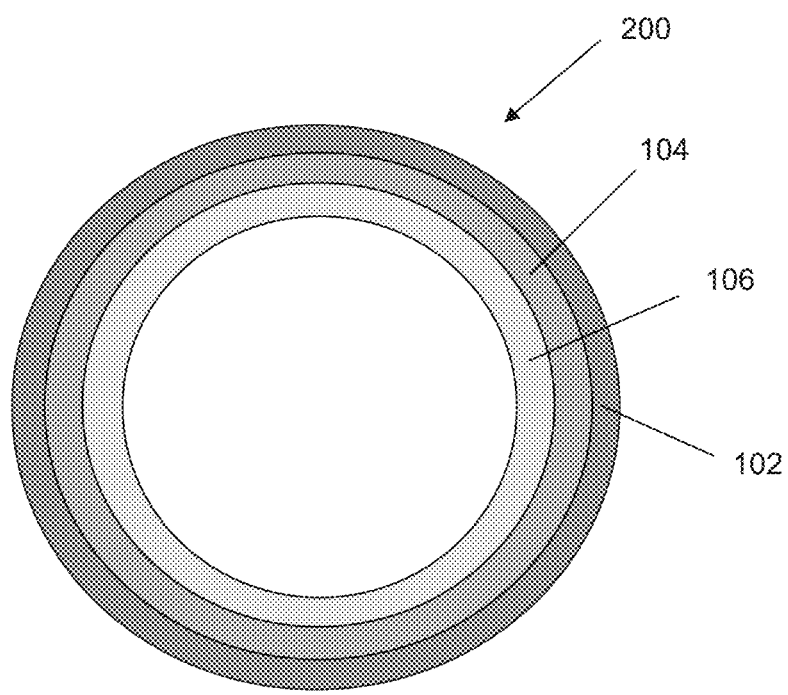
FIG. 2 shows a schematic cross-sectional view through a bearing shell formed from two of the half bearing shells of FIG. 1.

FIG. 2 illustrates an end-on cross-sectional view through a cylindrical bearing shell 200 formed from two of the half bearing shells 100 of FIG. 1. The cylindrical bearing shell 200 is formed from two half bearing shells 100, the ends of which have been connected together to form a cylindrical bearing shell with a hollow centre suitable for retaining a cooperating journal of a crankshaft (not shown).

When two semi-cylindrical bearing shells 100 are connected to form a cylindrical bearing shell 200, the overlay 106 forms the innermost surface of the bearing shell. The overlay 106 is thus configured to provide a running surface (or sliding surface) facing a cooperating moving part in a bearing assembly. In use, within an assembled bearing, the overlay 106 of the bearing shell 100 and a journaled shaft mutually cooperate, with an intervening film of lubricating oil (preferably providing hydrodynamic lubrication during normal running). The overlay 106 is particularly suited to accommodate small misalignments between the bearing surface and the shaft journal (conformability) and is able to receive and embed dirt particles circulating in the lubricating oil supply, so as to prevent scoring or damage to the journal surface by the debris (dirt embedability). The overlay 106 also provides suitable tribological properties between the bearing 100 and the shaft journal, if a failure of the intervening oil film should occur.

The overlay 106 is formed from a bearing material comprising a matrix of polyamide-imide (PAI) polymer material, throughout which 10 wt % of melamine cyanurate particles (not shown) are distributed (wt % proportions are specified with respect to the content of the formed overlay, after it has been cured). The melamine cyanurate particles have an average particle size of approximately 2.1 micrometres (µm).

The melamine cyanurate particles act as a solid lubricant in the overlay, and lower the coefficient of friction of the PAI overlay 106. The incorporation of melamine cyanurate solid lubricant in the PAI overlay may thus improve running-in behaviour, torque-to-turn tests and bearing lifetimes. By improving the coefficient of friction of the bearings in an engine, use of melamine cyanurate solid lubricant may further aid in improving engine efficiency and reducing emissions.

Due to its good thermal stability and low corrosivity, melamine cyanurate may advantageously prolong the lifetime of the overlay 106. The hydrogen-bonding network of the melamine cyanurate may further lead to improved load carrying capacity and fatigue resistance characteristics.

One example of suitable melamine cyanurate particles have a bulk density of 0.24 g/ml, a mean particle size of 2.1 µm, a $D_{10}$ of 0.5 µm, $D_{50}$ of 1.3 µm, and $D_{90}$ of 4.7 µm.

The overlay 106 also comprises further filler materials (not illustrated) of approximately 26 wt % aluminium flakes, less than 0.5 wt % leveller, and silane adhesion agent distributed throughout the matrix of the PAI polymer material.

Bearing materials and overlays embodying the invention may conveniently be made using techniques that are described in the prior art for forming overlays comprising fillers in polymer matrices. Such techniques are well known to the skilled person, but exemplary comments are set out below for completeness.

The overlay 106 is formed by depositing a bearing material comprising the polymeric PAI material dissolved in a solvent, in which the melamine cyanurate particles (and any other desired overlay fillers or particulates) are suspended. Prior to deposition, the melamine cyanurate particles (and any other suspended solid particulate) are preferably added to the PAI and maintained in suspension by agitation of the deposition mixture.

The size of the melamine cyanurate particles may advantageously enhance the dispersion of the particles within the bearing material, prior to deposition of the polymeric material, as the particles are sufficiently large to avoid agglomeration, and sufficiently small for uniform dispersion of the particles within the deposited overlay.

The overlay 106 may be deposited onto the substrate by a spray coating of the bearing material, from a spray gun. Alternatively, the overlay may be deposited by screen printing (i.e. through a mask), by a pad-printing process (i.e. an indirect offset-printing process, e.g. in which a silicone pad transfers a patterned layer of the plastic polymer composite material onto the sliding-bearing substrate), or by a transfer rolling process.

Although the overlay 106 may be deposited in a single deposition step, for greater thicknesses the overlay may be built up by deposition of a succession of sub-layers, with a flash-off stage provided between successive depositions to remove solvent from the sub-layers.

Curing the deposited overlay induces molecular cross-linking of molecules in the PAI plastic polymer. Curing also removes substantially all solvent from the overlay, including any residual solvent from flashed-off sub-layers.

The cured overlay 106 may have a thickness of 3 to 14 μm, with thicker layers being formed from a succession of sub-layers. For example, an overlay 106 of 8 to 12 μm thickness may be built up by the deposition of two or three sub-layers of the same bearing material.

Although described herein and illustrated in the drawings in relation to a half bearing shell and a cylindrical bearing shell, the present invention may equally apply to other sliding engine components, including semi-annular, annular or circular thrust washers, and bushes, and engines comprising such sliding engine components.

The invention claimed is:

1. A bearing material, comprising:
    a polymeric matrix of polyamide-imide (PAI) polymer material;
    a plurality of metal flakes composed of aluminum; and
    a solid lubricant consisting of melamine cyanurate, the melamine cyanurate comprising a plurality of melamine cyanurate particles dispersed within and distributed evenly throughout the polymeric matrix;
    wherein the plurality of melamine cyanurate particles have an average particle size of 0.5 μm to 3 μm; and
    wherein about 8 wt % to about 12 wt % of the bearing material is melamine cyanurate.

2. The bearing material according to claim 1, further comprising at least one of a dispersant, an adhesion agent, and a leveller.

3. A bearing element, comprising:
    a bearing material including a polymeric matrix of polyamide-imide (PAI) polymer material;
    a plurality of melamine cyanurate particles dispersed within and distributed evenly throughout the polymeric matrix such that the bearing material has a uniform composition;
    wherein the plurality of melamine cyanurate particles have an average particle size of 0.5 μm to 3 μm;
    wherein the plurality of melamine cyanurate particles have a bulk density of 0.24 g/ml, a $D_{10}$ of 0.5 μm, a $D_{50}$ of 1.3 μm, and a $D_{90}$ of 4.7 μm; and
    wherein about 8 wt % to about 12 wt % of the bearing material is melamine cyanurate.

4. A method of forming a bearing material, comprising mixing a polyamide-imide (PAI) polymer material with a plurality of particles of melamine cyanurate to define a dispersion, wherein:
    mixing the polyamide-imide (PAI) polymer material with the plurality of particles of melamine cyanurate includes evenly distributing the plurality of particles of melamine cyanurate throughout the dispersion; and
    the plurality of melamine cyanurate particles have a bulk density of 0.24 g/ml, a $D_{10}$ of 0.5 μm, a $D_{50}$ of 1.3 μm, and a $D_{90}$ of 4.7 μm.

5. The method according to claim 4, wherein mixing the polyamide-imide (PAI) polymer material with the plurality of particles of melamine cyanurate includes adding a quantity of the plurality of particles of melamine cyanurate to the polyamide-imide (PAI) polymer material such that the plurality of particles of melamine cyanurate form about 2 wt % to about 30 wt % of the dispersion.

6. A method of forming a bearing element, comprising:
    depositing onto a bearing element substrate a bearing material including a polymeric matrix of polyamide-imide (PAI) polymer material and a plurality of melamine cyanurate particles dispersed within and distributed evenly throughout the polymeric matrix such that the bearing material has a uniform composition; and
    mixing a plurality of aluminum flakes, a leveller, and an adhesion agent with the polyamide-imide (PAI) polymer material and the plurality of particles of melamine cyanurate such that:
    the plurality of particles of melamine cyanurate form about 8 wt % to about 12 wt % of the bearing material;
    the plurality of melamine cyanurate particles have a $D_{10}$ of 0.5 μm, a $D_{50}$ of 1.3 μm, and a $D_{90}$ of 4.7 μm;
    the plurality of aluminum flakes form about 26 wt % of the bearing material; and
    the leveller forms less than 0.5 wt % of the bearing material.

7. The bearing element according to claim 3, further comprising a bearing element substrate and an overlay layer disposed on the bearing element substrate, wherein the overlay layer is composed of the bearing material.

8. The bearing element according to claim 7, wherein the plurality of melamine cyanurate particles have an average particle size smaller than a thickness of the overlay layer.

9. The bearing element according to claim 7, wherein the overlay layer has a thickness of 3 μm to 25 μm.

10. The bearing element according to claim 3, further comprising a bearing element substrate and a plurality of overlay layers disposed on the bearing element substrate one on top of another, wherein each of the plurality of overlay layers is composed of the bearing material.

11. The bearing material according to claim 1, wherein the plurality of melamine cyanurate particles is the only solid lubricant material dispersed within the polymeric matrix.

12. The bearing material according to claim 1, wherein the plurality of melamine cyanurate particles have a bulk density of 0.24 g/ml, a $D_{10}$ of 0.5 μm, a $D_{50}$ of 1.3 μm, and a $D_{90}$ of 4.7 μm.

13. The method according to claim 6, further comprising:
    mixing the polyamide-imide (PAI) polymer material with the plurality of particles of melamine cyanurate to define the bearing material; and maintaining suspension of the plurality of particles of melamine cyanurate within the polyamide-imide (PAI) polymer material prior to depositing the bearing material onto the bearing element via agitating the bearing material.

14. The method according to claim 6, wherein:
depositing the bearing material onto the bearing element substrate includes depositing a plurality of sub-layers of the bearing material on top of one another; and
the method further comprises removing solvent from each of the plurality of sub-layers via performing a flash-off process between each successive deposition of a sub-layer of the plurality of sub-layers.

15. The bearing material according to claim 1, further comprising a leveller distributed throughout the polymeric matrix, wherein:
the plurality of aluminum metal flakes form about 26 wt % of the bearing material; and
the leveller forms less than 0.5 wt % of the bearing material.

16. The bearing material according to claim 15, wherein the plurality of melamine cyanurate particles have a $D_{10}$ of 0.5 μm, a $D_{50}$ of 1.3 μm, and a $D_{90}$ of 4.7 μm.

17. The bearing material according to claim 1, wherein the plurality of melamine cyanurate particles have a bulk density of 0.24 g/ml and the average particle size of the plurality of melamine cyanurate particles is 1 μm to 2 μm.

18. The bearing material according to claim 1, wherein the bearing material does not contain graphite, $MoS_2$, nor polytetrafluoroethylene (PTFE).

19. The bearing element according to claim 3, wherein the bearing element is structured as a crankshaft bearing shell for an internal combustion engine.

* * * * *